3,290,313
1-CARBAMOYL-4-XANTHENYLPIPERAZINES
John W. Cusic, Skokie, and Peter Yonan, Chicago, Ill., assignors to G. D. Searle & Co., Chicago, Ill., a corporation of Delaware
No Drawing. Filed Dec. 29, 1964, Ser. No. 422,009
9 Claims. (Cl. 260—268)

The present invention relates to a group of ureas and thioureas wherein one of the nitrogens is part of a xanthenylpiperazine structure. More particularly, the present invention relates to a group of compounds having the following general formula

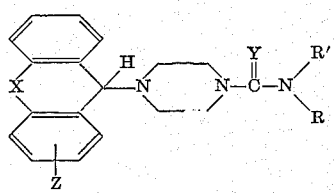

wherein X and Y are each selected from the group consisting of O and S; Z is selected from the group consisting of hydrogen, halogen, and methyl; R is selected from the group consisting of hydrogen, lower alkyl, cyclohexyl, phenyl, naphthyl, substituted phenyl, substituted naphthyl, and biphenylyl; and R' is selected from the group consisting of hydrogen, lower alkyl, and phenyl.

The halogen atoms referred to above include fluorine, chlorine, bromine, and iodine. The lower alkyl radicals referred to above contain up to 6 carbon atoms and can be exemplified by groups such as methyl, ethyl, propyl, butyl, and hexyl. When R in the above formula is substituted phenyl or substituted naphthyl, the substituent can be methyl, halogen, or methoxy wherein halogen is defined as above. Specific examples of such R groups would then be tolyl, chlorophenyl, bromophenyl, or methoxyphenyl.

It should be obvious that when X is O in the above formula, xanthenes are involved, and when X is S, the compounds are thioxanthenes. Furthermore, when Y is O the compounds can be considered as ureas or carbamoylpiperazines whereas when Y is S, the compounds can be considered as thioureas or N-thiocarbamoylpiperazines.

The compounds of the present invention are conveniently prepared by the reaction of a monosubstituted piperazine of the formula

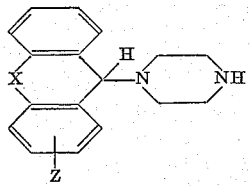

wherein X and Z are defined as above with an appropriate isocyanate, isothiocyanate, carbamoyl halide or thiocarbamoyl halide. Isocyanates are used to prepare those compounds in which R' is hydrogen while disubstituted carbamoyl halides are used to prepare those compounds in which both R and R' are substituent groups. Carbamoyl chlorides are particularly preferred in the latter reaction.

The monosubstituted piperazine used as the starting material above is conveniently prepared from the appropriate carbamate of the formula

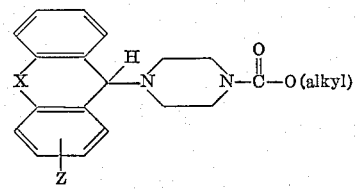

wherein X and Z are defined as above. The carbamate is heated in alkaline solution to remove the carbalkoxy group and leave the monosubstituted piperazine.

The compounds of the present invention can also be prepared by the reaction of the appropriate xanthydrol or thioxanthydrol with a 1-(carbamoyl or thiocarbamoyl) piperazine. The reaction is conveniently carried out at reflux in an inert solvent in the presence of a weak acid. Toluene is a particularly useful solvent although benzene and xylene are examples of other solvents which can be used for this purpose. A weak acid such as acetic acid can be used to catalyze the reaction.

The organic bases of this invention form pharmaceutically acceptable, non-toxic acid addition salts with a variety of organic and inorganic acids. Such salts are formed with acids such as sulfuric phosphoric, hydrochloric, hydrobromic, hydriodic, sulfamic, citric, lactic, maleic, malic, succinic, tartaric, cinnamic, acetic, benzoic, gluconic, ascorbic, and related acids.

The compounds of this invention are useful because of their pharmacological properties. In particular, the present compounds are useful because of their anti-ulcer activity. Thus, they inhibit ulceration in the Shay rat. This activity involves a decrease in the secretion of both acid and protease in the animal. The present compounds also reduce ulcers induced by prednisolone.

The present compounds are further active as anti-hypertensive agents and as anti-inflammatory agents. The latter activity is demonstrated by a phenylbutazone-like effect on edematous conditions.

The compounds which constitute this invention are illustrated by the following examples which should not be construed as limiting the invention in spirit or in scope. In these examples, quantities are indicated in parts by weight and temperatures in degrees centigrade (° C.).

*Example 1*

To a stirred solution of 43 parts of 1-carbethoxy-4-(9-xanthenyl)piperazine in 790 parts of ethanol there is added slowly a hot soltuion of 200 parts of sodium hydroxide in 200 parts of water. The resultant mixture is stirred at reflux for 3 hours and then cooled and added slowly, with stirring, to 5000 parts of ice water. The resultant mixture is filtered to remove the solid which is then recrystallized from hexane. The product thus obtained is 1-(9-xanthenyl)piperazine and it melts at about 118–119° C. This compound has the following formula

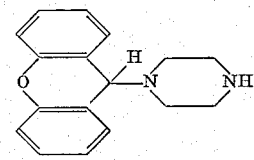

If the above procedure is repeated using 1-carbethoxy-4-(2-chloro-9-xanthenyl)piperazine, the product is 1-(2-chloro-9-xanthenyl)piperazine. Likewise, if 1-carbethoxy-4-(9-thioxanthenyl)piperazine is hydrolyzed with sodium hydroxide solution, the product is 1-(9-thioxanthenyl)piperazine.

*Example 2*

To a solution of 6.5 parts of 1-(9-xanthenyl)piperazine in 70 parts of anhydrous ether there is added 2.5 parts of ethyl isothiocyanate dropwise with stirring. A precipitate forms shortly and this is separated by filtration and recrystallized from a mixture of chloroform and ether to give 1-(N-ethylthiocarbamoyl)-4-(9-xanthenyl)piperazine melting at about 250–253° C. with decomposition. This compound has the following formula

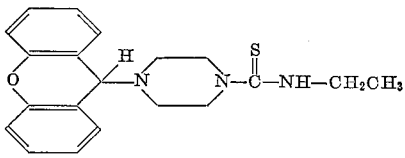

*Example 3*

3 parts of methyl isothiocyanate is reacted with 5 parts of 1-(9-xanthenyl)piperazine in a mixture of 70 parts of ether and 37 parts of chloroform according to the procedure described in Example 2. In this case, the product is 1-(N-methylthiocarbamoyl)-4-(9-xanthenyl)piperazine melting at about 240° C. (with decomposition) after recrystallization from a mixture of chloroform and ether.

In the same way, ethyl isothiocyanate reacts with 1-(2-chloro-9-xanthenyl)piperazine and 1-(9-thioxanthenyl)piperazine to give 1-(N-ethylthiocarbamoyl)-4-(2-chloro-9-xanthenyl)piperazine and 1-(N-ethylthiocarbamoyl)-4-(9-thioxanthenyl)piperazine respectively.

*Example 4*

The reaction of 3.5 parts of cyclohexyl isothiocyanate with 5 parts of 1-(9-xanthenyl)piperazine in 140 parts of ether gives 1-(N-cyclohexylthiocarbamoyl)-4-(9-xanthenyl)piperazine. This compound melts at about 250° C. (with decomposition) after recrystallization from a mixture of chloroform and ether. It has the following formula

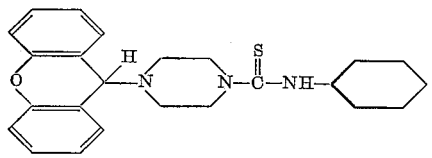

*Example 5*

3 parts of ethyl isocyanate is reacted with 5 parts of 1-(9-xanthenyl)piperazine in a mixture of 70 parts of ether and 37 parts of chloroform according to the procedure described in Example 2. The crude product is separated by filtration and recrystallized from a mixture of benzene and ether to give 1-(N-ethylcarbamoyl)-4-(9-xanthenyl)piperazine melting at about 185–186° C. This compound has the following formula

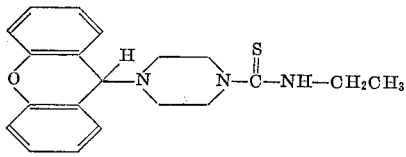

*Example 6*

If 3 parts of phenyl isothiocyanate is reacted with 5 parts of 1-(9-xanthenyl)piperazine in 105 parts of ether according to the procedure described in Example 2, the product is 1-(N-phenylthiocarbamoyl)-4-(9-xanthenyl)piperazine. This compound melts at about 253–256° C. (with decomposition) after recrystalliaztion from a mixture of chloroform and ether.

In a similar manner, 4-tolyl isothiocyanate, 3-chlorophenyl isothiocyanate, 4-bromophenyl isothiocyanate, and 4-methoxyphenyl isothiocyanate are each reacted with 1-(9-xanthenyl)piperazine to give the corresponding substituted N-phenylthiocarbamoylpiperazine.

*Example 7*

4 parts of 2-biphenylyl isocyanate is added dropwise to a solution of 5 parts of 1-(9-xanthenyl)piperazine in 140 parts of ether. The precipitate which forms shortly is separated by filtration and recrystallized from a mixture of chloroform and ether to give 1-[N-(2-biphenylyl)carbamoyl]-4-(9-xanthenyl)piperazine melting at about 171–172° C.

The reaction of 4 parts of 1-naphthyl isocyanate with 5 parts of 1-(9-xanthenyl)piperazine in the same manner gives 1 - [N - (1 - naphthyl)carbamoyl] - 4 - (9 - xanthenyl)piperazine melting at about 183–184° C. after recrystallization from a mixture of chloroform and ether. This compound has the following formula

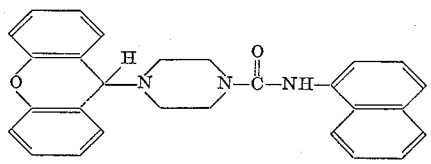

*Example 8*

A solution is prepared from 7 parts of 1-(9-xanthenyl)piperazine in 200 parts of acetone and 15 parts of potassium carbonate is added. The resultant mixture is heated to reflux with stirring and a solution of 7 parts of diphenylcarbamoyl chloride in 40 parts of acetone is added portionwise. The resultant mixture is then refluxed for an additional 2.5 hours and filtered while still hot. The separated inorganic material is washed with hot chloroform and the filtrates are combined. The solvent is then evaporated under reduced pressure until only a small volume remains. The addition of ether to this solution causes crystals to form. These are separated by filtration and recrystallized from a mixture of chloroform and ether to give 1 - (N,N - diphenylcarbamoyl) - 4-(9-xanthenyl) piperazine melting at about 213–215° C. This compound has the following formula

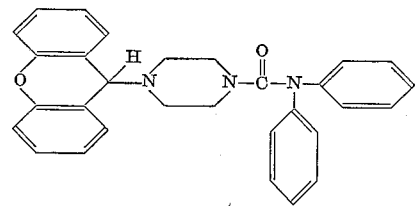

*Example 9*

Dimethylcarbamoyl chloride and diethylcarbamoyl chloride are each reacted with 1-(9-xanthenyl)piperazine according to the procedure described in Example 8 to give, respectively, 1 - (N,N - dimethylcarbamoyl) - 4-(9-xanthenyl)piperazine and 1 - (N,N-diethylcarbamoyl)-4-(9-xanthenyl)piperazine.

What is claimed is:
1. A compound of the formula

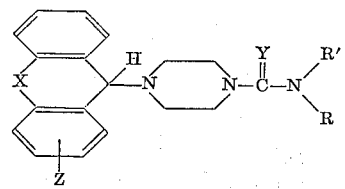

wherein X is selected from the group consisting of O and S; Y is selected from the group consisting of O and S;

Z is selected from the group consisting of hydrogen and chlorine; R is selected from the group consisting of lower alkyl, cyclohexyl, phenyl, tolyl, halophenyl, methoxyphenyl, biphenylyl, and napthyl; and R' is selected from the group consisting of hydrogen, lower alkyl, and phenyl.

2. A compound of the formula

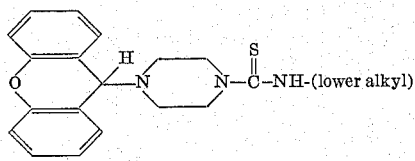

3. 1 - (N - methylthiocarbamoyl) - 4 - (9 - xanthenyl) piperazine.

4. 1 - (N - ethylthiocarbamoyl) - 4 - (9 - xanthenyl) piperazine.

5. A compound of the formula

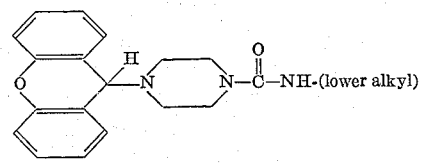

6. 1 - (N - ethylcarbamoyl) - 4 - (9 - xanthenyl) piperazine.

7. 1 - (N - phenylthiocarbamoyl) - 4 - (9 - xanthenyl) piperazine.

8. 1 - [N - (1 - naphthyl)carbamoyl] - 4-(9-xanthenyl) piperazine.

9. 1-(9-xanthenyl)piperazine.

No references cited.

ALEX MAZEL, *Primary Examiner.*

JAMES W. ADAMS, JR., *Assistant Examiner.*

UNITED STATES PATENT OFFICE
CERTIFICATE OF CORRECTION

Patent No. 3,290,313                              December 6, 1966

John W. Cusic et al

It is hereby certified that error appears in the above numbered patent requiring correction and that the said Letters Patent should read as corrected below.

Column 3, lines 59 to 65, the right-hand portion of the formula should appear as shown below instead of as in the patent:

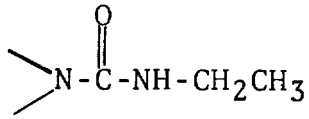

Signed and sealed this 24th day of October 1967.

(SEAL)
Attest:

Edward M. Fletcher, Jr.                          EDWARD J. BRENNER
Attesting Officer                                Commissioner of Patents